3,377,363
Δ⁵⁽¹⁰⁾-6-HYDROXYMETHYL-ESTRENE
COMPOUNDS
John S. Tadanier, Chicago, Ill., assignor to Abbott Laboratories, Chicago, Ill., a corporation of Illinois
No Drawing. Filed Apr. 13, 1966, Ser. No. 542,207
4 Claims. (Cl. 260—397.4)

The present invention is directed to new steroids; more particularly it is directed to 3,6,17-trisubstituted estranes. The new compounds are illustrated by the formula

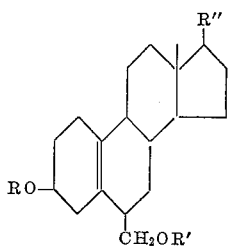

wherein R is hydrogen, loweralkyl or lower fatty acid acyl; R' is hydrogen or lower fatty acid acyl; and wherein R" is oxygen, hydroxy or lower fatty acid acyloxy. The lower fatty acid acyls preferred are those with 1–4 carbon atoms. Loweralkyl is meant to include saturated carbon chains of 1–4 carbon atoms.

The new compounds exhibit androgenic properties and are therefore useful for growth-promotion in warm-blooded animals. The androgenic effect can be easily demonstrated by administering between 0.1 and 3 mg./kg./day of the compounds to rats and other warm-blooded animals. The analogous dose for adult humans is between 2 and 75 mg./day administered intramuscularly in a vegetable oil suspension.

The new compounds carrying the 3-loweralkoxy group are made from 3β-loweralkoxy-19-alkyl(or aryl)sulfonoxyandrost-5-en-17-ones reported by Tadanier and Cole in Tetrahedron Letters of 1964, page 1345, by heating said material at 50–100° C. in a lower fatty acid for 5–20 hours. The corresponding compounds carrying in the 3-position an acyloxy group are made from 3β-acyloxy-19-alkyl(or aryl)sulfonoxyandrost-5-en-17-one reported by Halpern et al. in Steroids, volume IV, page 1 of 1964, by the same method. The corresponding 3-hydroxy compounds are made in the usual manner by hydrolysis of the 3-acyloxy compounds. The preferred lower fatty acids used in the above procedure are formic, acetic, propionic or butyric acid.

In order to illustrate the process of the present invention, reference is made to the following examples which are, however, not meant to limit the invention. Wherever these examples refer to solvent mixtures without naming the ratio thereof it is to be understood that the first-named solvent is used to dissolve the solid material and the other is added after concentrating the solution to induce or to complete crystallization of the solid.

Example 1.—3β-methoxy-6β-hydroxymethylestr-5(10)-en-17-one

A solution of 5.1 g. of 3β-methoxy-19-methanesulfonoxy-androst-5-en-17-one in 250 ml. of acetic acid containing 5.0 ml. of acetic anhydride is heated at 100° for 16 hours. The resulting dark solution is cooled to room temperature and shaken with a mixture of 1200 ml. of ether and 2000 ml. of water. The aqueous phase is separated and extracted with 1200 ml. of ether. The two ether solutions are washed in series with four 500-ml. portions of water, two 500-ml. portions of 5% aqueous sodium bicarbonate and three 500-ml. portions of water. The organic extracts are combined and dried over anhydrous magnesium sulfate. Evaporation of the ether leaves 4.23 g. of a dark oil. This crude material is heated under reflux for one hour with a solution prepared from 8.5 g. of potassium hydroxide and 700 ml. of methanol. After adding 200 ml. of water, the major portion of the methanol is evaporated under reduced pressure. The resulting aqueous suspension is diluted to 500 ml. with water and extracted with three 400-ml. portions of ether. The ether solutions are combined, dried over anhydrous magnesium sulfate and the ether is evaporated, leaving 3.51 g. of an oil which is then chromatographed on 220 g. of neutral, activity-III alumina. Elution with ten 100-ml. portions of benzene produces 652 mg. of an orange oil. Elution with ten 100-ml. portions of ether-benzene 1:1 yields 2.56 g. of 3β-methoxy-6β-hydroxymethylestr-5(10)-en-17-one. After two recrystallizations from acetone-petroleum ether, 1.3 g. of the pure product is obtained; it melts at 128–130° C.; its analysis is in good agreement with the empirical formula $C_{20}H_{30}O_3$.

When the starting material used above carries a 3-propionoxy group, the 3β-propionoxy-6β-hydroxymethylestr-5(10)-en-17-one is obtained by the same procedure. Using a starting material carrying a 19-toluenesulfonoxy group, identical results are obtained.

Example 2.—3β-methoxy-6β-acetoxymethylestr-5(10)-en-17-one

To a solution of 350 mg. of 3β-methoxy-6β-hydroxymethylestr-5(10)-en-17-one in 10.5 ml. of pyridine is added 3.5 ml. of acetic anhydride. The resulting solution is allowed to stand overnight at room temperature and is then shaken with a mixture of 100 ml. of water and 80 ml. of ether. The aqueous solution is separated and extracted with two 80-ml. portions of ether. The ether solutions are washed in series with three 80-ml. portions of water, two 80-ml. portions of 5% aqueous sodium bicarbonate and three 80-ml. portions of water. The extracts are combined and dried over anhydrous magnesium sulfate. Evaporation of the solvent leaves 409 mg. of 3β-methoxy-6β-acetoxymethylestr-5(10)-en-17-one as a colorless oil well-characterized by its infrared and nuclear magnetic resonance spectra. The analysis is in good agreement with the empirical formula $C_{22}H_{32}O_4$.

By substituting for acetic anhydride in the above process the equimolar amount of propionyl chloride, 3β-methoxy-6β-propionoxymethylestr-5(10)-en-17-one is obtained.

Example 3.—3β-methoxy-6β-hydroxymethylestr-5(10)-en-17β-ol

To a solution of 430 mg. of 3β-methoxy-6β-hydroxymethylestr-5(10)-en-17-one in 26 ml. of methanol is added 12 ml. of a solution prepared from 1.8 g. of sodium borohydride and 20 ml. of water. The resulting solution is stirred at room temperature for 30 minutes and then poured into 500 ml. of water. The resulting aqueous suspension is extracted twice with 300 ml. of ether. The ether solutions are washed in series with three 150-ml. portions of water, combined, and dried over anhydrous magnesium sulfate. Evaporation of the ether leaves 402 mg. of 3β-methoxy-6β-hydroxymethylestr-5(10)-en-17β-ol. The analysis is in good agreement with the empirical formula $C_{20}H_{32}O_3$.

Example 4.—3β-methoxy-6β-acetoxymethylestr-5(1)-en-17β-ol

To a solution of 450 mg. of 3β-methoxy-6β-acetoxymethylestr-5(10)-en-17-one in 28 ml. of methanol at 0° is added 14 ml. of a solution prepared from 1.8 g. of sodium borohydride and 20 ml. of water. The solution is stirred at 0° for 45 minutes and then poured into 500 ml. of water. The resulting aqueous suspension is extracted twice with 300 ml. of ether. The ether solutions are washed in series with three 150-ml. portions of water, combined, and dried over anhydrous magnesium sulfate. Evaporation of the ether leaves 3β - methoxy - 6β-acetoxymethylestr-5(10)-en-17β-ol in almost quantitative yield. The analysis is in good agreement with the empirical formula $C_{22}H_{34}O_4$.

Example 5.—3β-methoxy-6β-acetoxymethyl-17β-acetoxyestr-5(10)-ene

To a solution of 350 mg. of 3β - methoxy-6β-hydroxymethylestr-5(10)-en-17β-ol in 11 ml. of pyridine is added 3.5 ml. of acetic anhydride. The resulting solution is allowed to stand overnight at room temperature and the product is then isolated by ether extraction as described in Example 3 to yield 3β-methoxy-6β-acetoxymethylestr-5(10)-en-17β acetate. The analysis is in good agreement with the empirical formula $C_{24}H_{36}O_5$.

By substituting for the acetic anhydride above 4 ml. of butyryl chloride, the described method produces 3β-methoxy - 6β - butyroxymethyl - 17β - butyroxyestr-5(10)-ene in a yield of 70% of theory.

Example 6.—3β-hydroxy-6β-hydroxymethylestr-5(10)-en-17-one

A solution of 5.0 g. of 3β - acetoxy - 19-p-toluenesulfonoxyandrost-5-en-17-one in 250 ml. of acetic acid containing 5.0 ml. of acetic anhydride is heated at 100° for 16 hours. The resulting solution is cooled and the product is isolated by ether extraction and then subjected to basic hydrolysis with 5% methanolic potassium hydroxide as described in Example 1. Placing the crude product on a neutral activity III alumina column and eluting it with methanolchloroform 1:10 yields 3β-hydroxy - 6β - hydroxymethylestr-5(10)-en-17-one. The obtained analysis is in good agreement with the empirical formula $C_{19}H_{28}O_3$.

Example 7.—3β,17β-dihydroxy-6β-hydroxymethylestr-5(10)-ene

To a solution of 450 mg. of 3β - hydroxy-6β-hydroxymethylestr-5(10)-en-17-one in methanol is added a solution prepared from 1.8 g. of sodium borohydride and 20 ml. of water. The solution is stirred at room temperature for 30 minutes and the product is isolated by extracting it from the reaction mixture with chloroform to yield 3β,17β - dihydroxy-6β-hydroxymethylestr-5(10)-ene. The analysis is in good agreement with the empirical formula $C_{19}H_{30}O_3$.

Example 8.—3β-acetoxy-6β-acetoxymethylestr-5(10)-en-17-one

This product is prepared from 3β - hydroxy-6β-hydroxymethylestr-5(10)-en-17-one by the method of Example 2. The analysis is in good agreement with the empirical formula $C_{23}H_{32}O_5$.

Example 9.—3β,17β-diacetoxy-6β-acetoxymethylestr-5(10)-ene

This product is prepared from 3β,17β - dihydroxy - 6β-hydroxymethylestr-5(10)-ene by the method of Example 2. The analysis is in good agreement with the empirical formula $C_{25}H_{36}O_6$.

Others may practice the invention in any of the numerous ways which will be suggested to one skilled in the art by the present disclosure. All such practice of the invention is considered a part hereof provided it falls within the scope of the appended claims.

I claim:

1. A compound of the formula

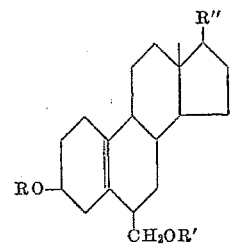

wherein R is hydrogen, lower alkyl or a lower fatty acid acyl group, R' is hydrogen or a lower fatty acid acyl group and wherein R" is oxygen, hydroxy or a lower fatty acid acyloxy group.

2. The compound of claim 1 wherein R is methyl, R' is hydrogen and R" is oxygen.

3. The compound of claim 1 wherein R is methyl, R' is acetyl and R" is oxygen.

4. The compound of claim 1 wherein R is methyl, R' is hydrogen and R" is the hydroxy group.

References Cited

UNITED STATES PATENTS 3,206,460   9/1965   Bowers ---------- 260—239.55

ELBERT L. ROBERTS, *Primary Examiner.*

E. G. LOVE, *Assistant Examiner.*